(No Model.) 3 Sheets—Sheet 1.

S. YOUNG & M. MOSKOWITZ.
ELECTRIC CAR LIGHTING SYSTEM.

No. 478,183. Patented July 5, 1892.

WITNESSES:

INVENTORS:
Samuel Young and
Morris Moskowitz,
BY Fred. C. Fraentzel, ATT'Y.

(No Model.) 3 Sheets—Sheet 2.

S. YOUNG & M. MOSKOWITZ.
ELECTRIC CAR LIGHTING SYSTEM.

No. 478,183. Patented July 5, 1892.

WITNESSES:
Wm. H. Canfield Jr.
B. Mortimer Trusdell.

INVENTORS:
Samuel Young
and
Morris Moskowitz,
BY Fred C. Fraentzel, ATT'Y.

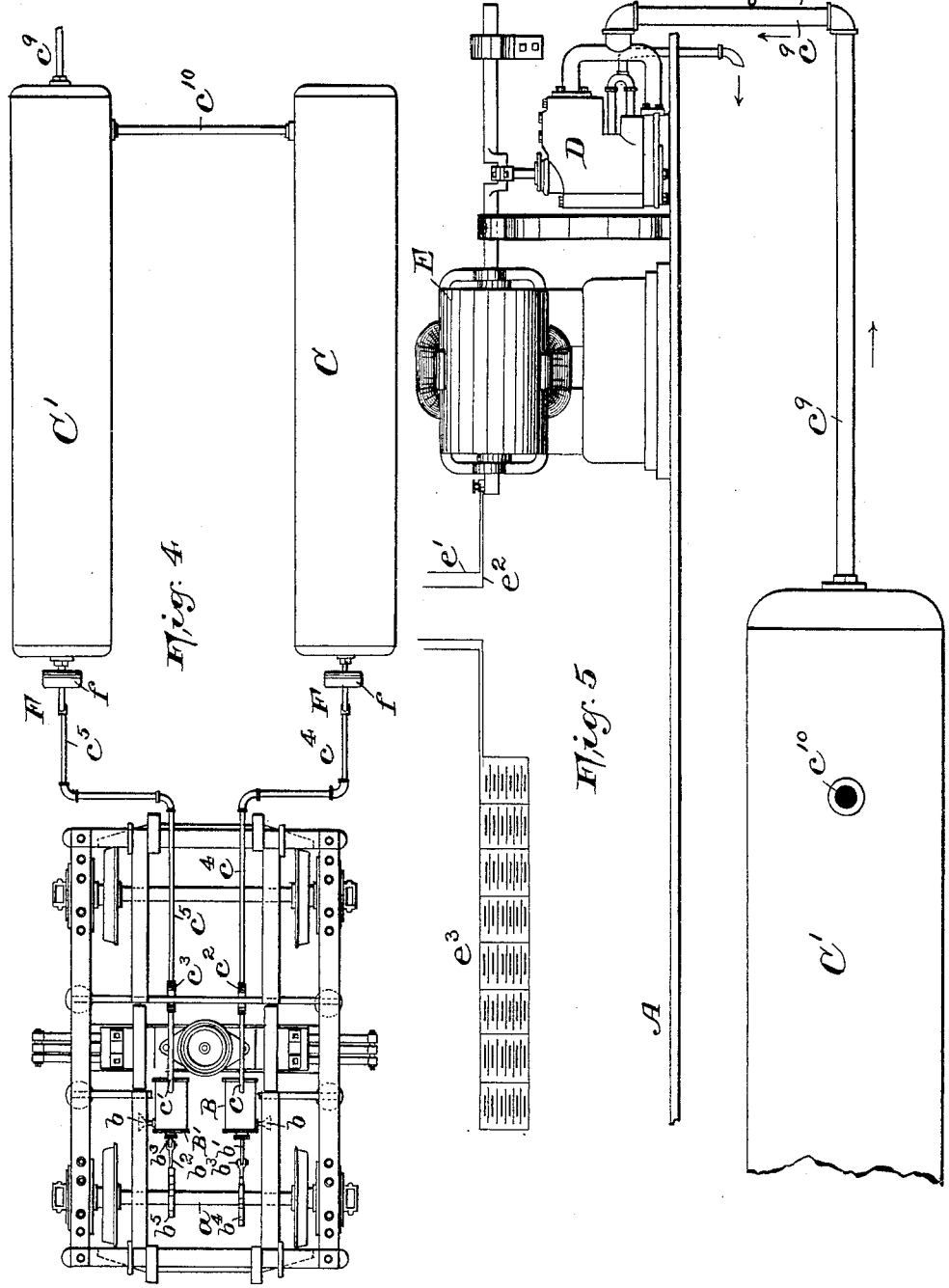

UNITED STATES PATENT OFFICE.

SAMUEL YOUNG AND MORRIS MOSKOWITZ, OF NEWARK, NEW JERSEY, ASSIGNORS OF ONE-FOURTH TO LEON D. ADLER AND JOSEPH LOEWENBERG, OF SAME PLACE.

ELECTRIC CAR-LIGHTING SYSTEM.

SPECIFICATION forming part of Letters Patent No. 478,183, dated July 5, 1892.

Application filed January 13, 1892. Serial No. 417,932. (No model.)

*To all whom it may concern:*

Be it known that we, SAMUEL YOUNG and MORRIS MOSKOWITZ, citizens of the United States, residing at Newark, in the county of Essex and State of New Jersey, have invented certain new and useful Improvements in Electric Car-Lighting Systems; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to improvements in systems for lighting railway, cable, or other cars by electricity; and it consists of certain arrangements and combinations of parts, such as will be hereinafter more fully described, and finally embodied in the clauses of the claim.

The invention is illustrated in the accompanying sheets of drawings, in which—

Figure 1:
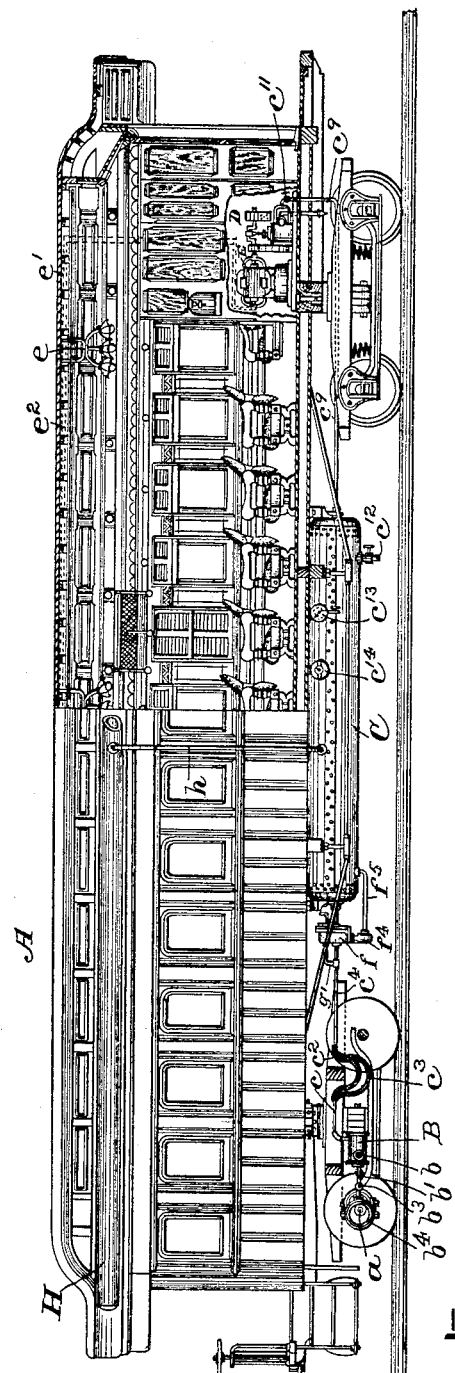
Figure 2:
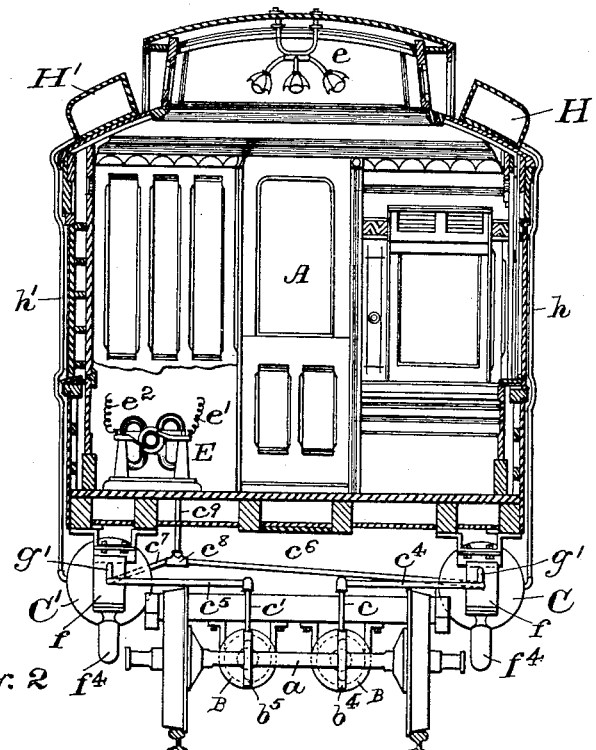
Figure 3:
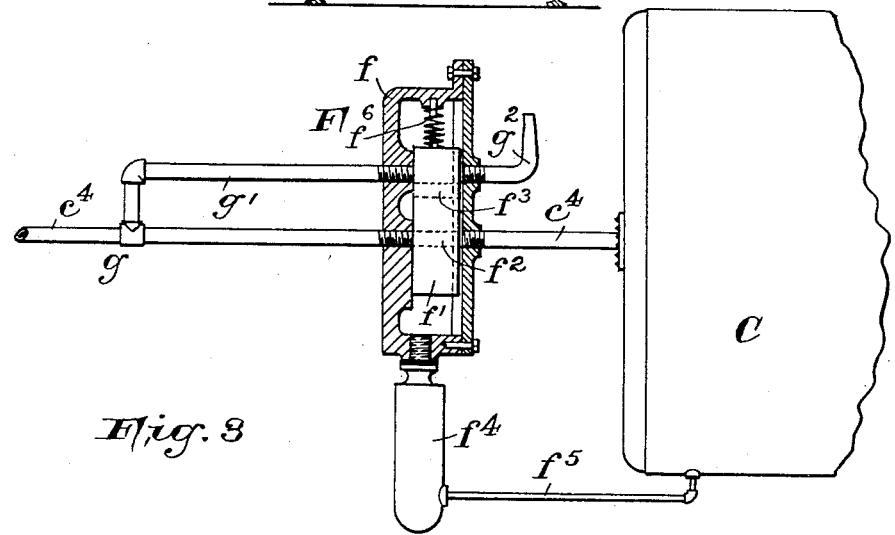

Figure 1 is a part elevation and part section of a railway-car, illustrating in side view the arrangement of the air-compressors on the truck, air storing-tanks or receivers secured to the bottom of the car, air-equalizers arranged in the piping between said air compressors or receiving-tanks, a series of receiving-tanks or receivers on the roof of the car in communication with the receivers beneath the car, and an engine and dynamo connected with said tanks or receivers, part of the view illustrating the interior of the car and an arrangement of incandescent lights. Fig. 2 is a vertical cross-section of the railway-car, illustrating in end view the compressors on the truck, the air-receiving tanks underneath the car, and the connecting-pipes and the dynamo within the car, and the receiving-tanks upon the roof of the car being represented in cross-section. Fig. 3 is a view, partly in side elevation and vertical section, of the air-equalizing device arranged in the system of piping between the air storage or receiving tank and the air-compressor. Fig. 4 is a plan view of a truck, compressors thereon, and the air-receiving tanks with their connecting-pipes and the air-equalizing devices in said connecting-pipes. Fig. 5 is a side view of part of the storage or air-receiving tank and an air-engine, a dynamo, and secondary batteries arranged in circuit with said dynamo.

Similar reference-letters are employed in each of the above-described views to indicate corresponding parts.

In said above-described views, A indicates the railway-car, and $a$ one of the car-wheel axles.

Secured directly upon the truck are two air compressors or pumps B and B', each being provided with the air inlets or valves $b$. The piston of each cylinder of said compressors is provided with the rods $b'$ and $b^2$, respectively, which are pivotally connected by means of the pins $b^3$ with the eccentrics $b^4$ and $b^5$, arranged on eccentric-bearings on the axle $a$, as will be evident from Figs. 1, 2, and 4. Each compressor B and B' has extending therefrom a pipe $c$ and $c'$, respectively connected by means of flexible tubings $c^2$ and $c^3$ with the pipes $c^4$ and $c^5$, which terminate in air receiving or storage tanks C and C', firmly secured to the bottom of the car. From the forward ends of said tanks C and C', as will be seen more especially from Fig. 2, extend the pipes $c^6$ and $c^7$, which communicate by means of a T $c^8$ and from which a pipe $c^9$ passes to the valve-chamber of a suitable air-engine D, which is preferably single-acting. Said engine is connected with a suitable dynamo E and in circuit are arranged any number of incandescent lamps $e$, connected with the dynamo by means of the wires $e'$ and $e^2$. If desirable, a series of secondary batteries $e^3$ may be arranged in said circuit, as will be seen from Fig. 5.

Instead of the pipes $c^6$ and $c^7$, extending from the tanks C and C', as shown in Fig. 2, said pipes can be dispensed with and the communication between the tanks established by means of a pipe $c^{10}$, as illustrated in Fig. 5, in which case the pipe $c^9$ is in direct communication with the valve-chest of the engine and the tank C. A suitable valve $c^{11}$ can be placed in said pipe (see Fig. 1) in order to shut off the supply of air to the engine, if necessary.

Each air receiving or storage tank C and C' can be provided with a blow-off or refilling cock $c^{12}$, an air-gage $c^{13}$, and a safety-valve $c^{14}$.

At any convenient point in the pipes $c^4$ and $c^5$ we have arranged the air-equalizing devices F, which are adapted to act automatically to relieve the pressure of air in the tanks C and C' and to cause the air-compressors on the truck to exhaust the air to a point outside of said tanks. This equalizing device F, as will be seen from Fig. 3, consists of a cylinder $f$, in which is arranged a suitable slide-valve $f'$, provided with suitable air-passages $f^2$ and $f^3$. This cylinder $f$ and the passages $f^2$ in the valve $f'$ normally establish a direct communication through said passage and the two sections of the pipe between which said cylinder is arranged for the air from one of said compressors to one of the air-storing tanks. Said cylinder $f$ is provided at its lower portion with a small air-chamber $f^4$, which is in direct communication by means of a pipe $f^5$ with the air receiving or storage tank. At a point $g$ in said pipes $c^4$ and $c^5$ is a T-joint from which extends a pipe $g'$, which leads into said valve-cylinder $f$, directly in front of the solid portion of said valve above the passage $f^3$ therein. Directly opposite in the cylinder $f$ we have secured an exhaust-pipe $g^2$. Thus when the compressors or pumps B and B' are in operation there is an unobstructed passage through the pipes $c^4$ and $c^5$, through the equalizing devices F, into the two tanks C and C', filling said tanks and the air-reservoir $f^4$; but the valve $f'$ is so balanced that when the air in said tanks reaches a maximum pressure the valve $f'$ will be raised, thereby obstructing the passage through the pipes $c^4$ and $c^5$ and establishing a direct passage for the air through pipe $g'$, passage $f^3$ in the valve, and through the exhaust-pipe $g^2$, as will be clearly understood from said Fig. 3. As soon as the air contained in the tanks C and C' is withdrawn by the engine D the pressure becomes lowered and the valve $f'$ drops automatically to its normal position, again opening communication with the pipe $c^4$ or the pipe $c^5$. A spring $f^6$ may be arranged above said valve, if desirable, to counteract the upper passage of said valve and help to force it back to its normal position within the cylinder $f$.

From Figs. 1 and 2 it will be evident that we may arrange upon the roof of the car the air-receiving tanks or reservoirs H and H', which are in communication with the tanks C and C' by means of the pipes $h$ and $h'$, placed in any suitable position on the car.

The operation of our system is as follows: The pumps or compressors B and B' on the truck are caused to force the air into the receivers or tanks C and C' by means of the intermediately-arranged eccentrics operated by the revolutions of the car-axle. While the train is in motion, the tanks C and C' and the tanks H and H', when the latter are used in connection with the system, become sufficiently filled with air, in which it is compressed and stored, and when needed to drive the engine D can be drawn therefrom by opening the valve $c^{11}$.

It is of great advantage to carry a number of air-receiving tanks connected with each other, whereby the pressure becomes equalized and will give a store of power of sufficient energy to drive the engine and dynamo when the train stops, and thereby maintain a current which will keep the lights burning for more than three hours. Of course we may use the storage-batteries, which can be filled by the operation of the dynamo and can be used in case of any unforseen break to the engine or any other parts of our system; but it is our intention to use them only when absolutely necessary.

It very often happens that when trains are made up at the terminal stations they stand for hours in the depot. Therefore in order to charge the tanks C and C' with compressed air each tank is provided with a cock or nipple $c^{12}$, to which can be attached a tube, and compressed air can be forced into the tank from a small plant located in the vicinity of the station.

Having thus described our invention, what we claim is—

1. The herein-described system for electrically lighting cars, consisting, essentially, of the combination, with a pivoted truck, of an air-compressor on said truck, means for driving said air-compressor from the axle, consisting, essentially, of eccentrics rotating with and arranged on the axle and connected with the air-compressor, an air-engine and dynamo connected therewith, an air receiver or storage-tank intermediately arranged between said compressor and air-engine, and a pressure-regulator arranged in the piping between said compressor and air-receiver, acting automatically to shut off the air from the compressor into said air-tank and cause the compressor to exhaust outside of the tank, and a flexible tube connection in the piping between said air-compressor and the regulator, substantially as and for the purposes set forth.

2. The herein-described system for electrically lighting cars, consisting, essentially, of an air-compressor, means for driving said air-compressor from the car-axle, an air-engine and dynamo connected therewith, an air receiver or storage-tank intermediately arranged between said compressor and air-engine, and a pressure-regulator arranged in the piping between said compressor and air-receiver, acting automatically to shut off the air from the compressor into said air-tank and cause the compressor to exhaust outside of the tank, said regulator consisting, substantially, of a cylinder $f$, provided with a slide-valve having ducts $f^2$ and $f^3$, an air-chamber, a pipe connecting said chamber with the air or storage tank, and an exhaust-pipe leading from said cylinder $f$, substantially as and for the purposes set forth.

3. The herein-described system for electrically lighting cars, consisting, essentially, of air compressors or pumps arranged on the car-wheel truck, eccentrics on one of the axles of the truck for driving said compressors or pumps from the car-axle, pipes $c$ and $c'$, extending from said compressors, pipes $c^4$ and $c^5$, and flexible connections between said pipes, air receiving or storage tanks C and C', a cock or valve $c^{12}$ in each tank for filling the same when the car is not in motion, and an air-engine and dynamo connected with said tanks C and C', substantially as and for the purposes set forth.

4. The herein-described system for electrically lighting cars, consisting, essentially, of air compressors or pumps arranged on the car-wheel truck, eccentrics on one of the axles of the truck for driving said compressors or pumps from the car-axle, pipes $c$ and $c'$, extending from said compressors, pipes $c^4$ and $c^5$, and flexible connections between said pipes, air receiving or storage tanks C and C', a cock or valve $c^{12}$ in each tank for filling the same when the car is not in motion, and an air-engine and dynamo connected with said tanks C and C', and a pressure-regulator in each of said pipes $c^4$ and $c^5$, acting to automatically shut off the air from the compressors into said receivers C and C', substantially as and for the purposes set forth.

5. In a system for electrically lighting cars, in combination, air-compressors arranged on the car-truck, means for driving the same from the car-axle, an air-engine and dynamo, air receivers or storage tanks C and C' beneath the car, and air receivers or storage tanks on the roof of the car, all communicating with each other, and regulating devices arranged in the connections between said air compressors and tanks C and C', adapted to automatically cut off the supply of air to said tanks, substantially as and for the purposes set forth.

6. In a system for electrically lighting cars, in combination, an air-compressor on the truck of the car, an eccentric for driving the same, an air-receiving tank, an air-engine and dynamo, pipes connecting the same, and an automatic regulating device to decrease the pressure of air in the receiving-tank, consisting, essentially, of a cylinder provided with a slide-valve having ducts $f^2$ and $f^3$, an air-chamber, a pipe connecting said chamber with the air or storage tank, and an exhaust-pipe leading from said cylinder $f$, substantially as and for the purposes set forth.

7. The herein-described system for electrically lighting cars, consisting of an air-compressor, eccentrics driving said air-compressor directly from the car-wheel axle, an air-engine and dynamo connected therewith, an air receiver or storage tank intermediately arranged between said compressor and air-engine, and a pressure-regulator arranged in the piping between said compressor and air-receiver, acting automatically to shut off the air from the compressor into said air-tank and cause the compressor to exhaust outside of the tank, said regulator consisting, substantially, of a cylinder $f$, provided with a slide-valve, an air-chamber connected with said cylinder, a pipe connecting said chamber with the air or storage tank, and an exhaust-pipe leading from said cylinder $f$, substantially as and for the purposes set forth.

In testimony that we claim the invention set forth above we have hereunto set our hands this 8th day of January, 1892.

SAMUEL YOUNG.
MORRIS MOSKOWITZ.

Witnesses:
FREDK. C. FRAENTZEL,
WM. H. CANFIELD, Jr.